United States Patent

[11] 3,592,426

| [72] | Inventors | George A. Dubey<br>Branford;<br>Edwin C. Taylor, New Haven, both of, Conn. |
|---|---|---|
| [21] | Appl. No. | 800,100 |
| [22] | Filed | Feb. 18, 1969 |
| [45] | Patented | July 13, 1971 |
| [73] | Assignee | MIF Industries, Inc.<br>Branford, Conn. |

[54] MULTIPURPOSE POLE LINE CLAMP
7 Claims, 7 Drawing Figs.

| [52] | U.S. Cl. | 248/67.5, 248/221 |
|---|---|---|
| [51] | Int. Cl. | F16l 3/10 |
| [50] | Field of Search | 248/67.5, 61, 221, 63, 64, 67.7, 62; 254/134.3 PA, 134.3 FT |

[56] References Cited
UNITED STATES PATENTS

| 2,775,422 | 12/1956 | VonHerbulis | 248/63 |
| 3,006,674 | 10/1961 | Becker | 248/62 X |
| 3,198,464 | 8/1965 | Huggins | 248/67.5 |

Primary Examiner—Chancellor E. Harris
Attorney—Mattern, Ware and Davis

ABSTRACT: A multipurpose pole line clamp for stringing and clamping utility cables. The clamp comprises a bearing member and a clamping member, assembled together on a through bolt securing them to the pole. Facing surfaces of the bearing and clamping members cooperate to clamp a messenger cable securely anchored in its installed position alongside each pole. Each member incorporates a trunnion support post, and these posts engage and secure a stringing block during installation of the utility wire.

PATENTED JUL 13 1971 3,592,426

INVENTORS
GEORGE A. DUBEY
EDWIN C. TAYLOR

BY
Mattern Ware & Davis
ATTORNEYS

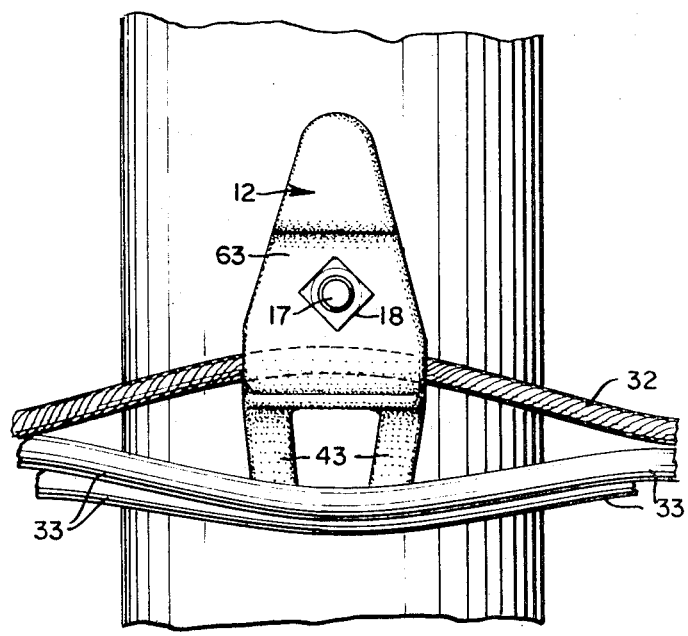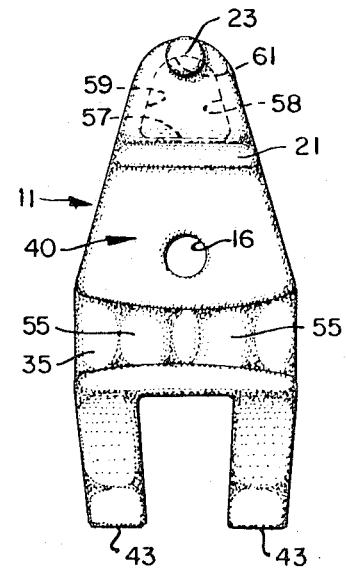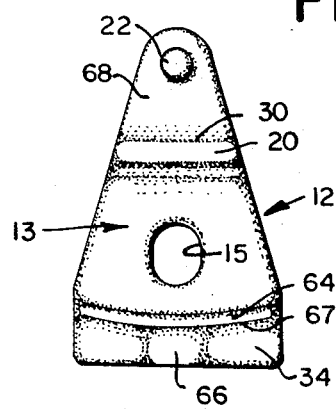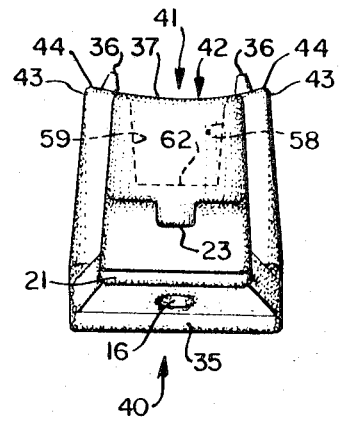
INVENTORS
GEORGE A. DUBEY
EDWIN C. TAYLOR
BY
*Mattern Ware & Davis*
ATTORNEYS 3,592,426

MULTIPURPOSE POLE LINE CLAMP

BACKGROUND OF THE INVENTION

This invention relates to pole line clamps for utility wires and more particularly to a multipurpose pole line clamp for stringing and clamping the utility wires.

Utility wires for attachment to utility poles generally comprise a messenger cable plus several other power-conducting cables. The messenger is secured to the other cables by heavy binding wire and is separated therefrom at the utility pole where the messenger cable is clamped to provide vertical support for the power carrying cables. During installation, a stringing block is utilized at each successive pole to pull the cables so that they are drawn moderately taut between one pole and the next. After the cables are taut they are removed from the stringing block and permanently attached to a clamp mounted on the pole for permanent installation, and the clamp further secures the cable from lateral movement. Generally, the messenger cable is separated from the other cables at the clamp and is attached to it while the power carrying cables hang slightly below the clamp.

The installation of utility wires is time consuming and expensive. A separate block-supporting assembly is normally attached to the pole and utilized to secure the stringing block, while another assembly is utilized to secure the clamp to the pole. Each assembly requires a separate through hole extending through the pole for engagement with a through bolt for each assembly. After the stringing operation is completed, the block-supporting assembly which secures the stringing block is removed from the pole by removal of the through bolt and stored for use with another pole. Significant time is required for the installation operation because two separate attachments to the pole must be made and a disengagement from the pole must also be made at the completion of the stringing operation.

For heavy cable, the surfaces of the clamp which secure the messenger wire must assure against lengthwise movement thereof. In the prior art, significant lengthwise movement or slip is found in many installations, which cause a dangerous slackening of the power cables between poles. Further, prior art clamps tend to be solid castings throughout, which are heavy to manipulate while the lineman is on the pole.

An object of the present invention is to provide a simple yet rugged multipurpose clamp for stringing and clamping utility wires.

Another object of the present invention is to provide a multipurpose clamp for stringing and clamping utility wires with only one installation.

A further object of the present invention is to provide a clamp for utility wires having the surfaces thereof which hold the messenger wire arranged for secure engagement to prevent lengthwise movement of the messenger cable.

Still another object of the present invention is to provide a relatively lightweight multipurpose clamp for stringing and clamping utility wires.

SUMMARY OF THE INVENTION

In accordance with the principles of the present invention, the foregoing objects are accomplished by providing a multipurpose clamp for stringing and clamping utility wires comprising a bearing member adapted to abut against a utility pole including a bearing surface and a first stringing block-supporting trunnion post, a clamping member including a clamping surface and a second stringing block-supporting trunnion post arranged in juxtaposed endwise coaxial relationship facing the first stringing block-supporting post, with the bearing and clamping members being arranged so that the clamping surface overlies the bearing surface and the two surfaces cooperate to clamp a messenger wire therebetween when the bearing and clamping members are assembled and drawn together.

One method for drawing and securing the bearing and clamping members together is to drill a through hole through the utility pole so that a through bolt can be inserted through the pole to permit the bearing and clamping members to be assembled thereon and drawn together or moved apart by controlling the through bolt and its associated nut.

During installation, the multipurpose clamp of the present invention is initially loosely secured to the utility pole by means of a bolt extending through the hole in the pole and engaging the bearing and clamping members. A stringing block is placed between the first and second stringing block-supporting trunnion posts, and the bolt is then tightened to secure the stringing block to the multipurpose clamp and to the pole by its engagement with the supporting post of the multipurpose clamp. The installation of similar multipurpose clamps may be made at several successive poles, and when the cables are pulled through the stringing blocks and are drawn sufficiently taut between poles, the cables are then released from the stringing blocks one by one. Next the bolt is loosened by backing off its nut; the clamp members are separated far enough to remove the stringing block; the messenger cable is placed between the cooperating surfaces of the bearing and clamping members for permanent installation; and the bolt is then tightened to secure a messenger cable from lengthwise movement. Therefore, the installation of utility wires in accordance with the principles of the present invention may be quickly made with only one through bolt and one prime assembly, and the functions of disassembling the stringing block and securing the messenger cable to the clamp may be made simultaneously, obviating the necessity for the time consuming installation procedures required in the past.

According to the principles of the present invention, the surfaces of the bearing and clamping members which engage the messenger cable are preferably undulated to provide extra gripping action to further insure against lengthwise movement of the utility wire. The undulated surfaces cause the messenger cable to be sinuously crimped and held securely after the through bolt is tightened.

The bearing member is adapted to butt against the utility pole at two areas, an upper and lower portion of the bearing member; the lower portion may include prongs for securing the bearing member in the utility pole, while the upper portion is provided with a concave cavity facing the pole to provide a lighter weight for the overall clamp assembly. This lighter weight facilitates the installation job since it permits easier manipulation by the lineman. The upper portion terminates in an abutment rim seating against the pole surface when the bearing member is drawn against the pole.

THE FIGURES

FIG. 4 is a front elevation view of the multipurpose clamp engaging and securely holding the messenger cable which is displaced from the power carrying cables;

FIG. 5 is a front view of the bearing member;

FIG. 6 is a top view of the bearing member; and

FIG. 7 is a rear view of the clamping member.

OPERATIONAL EQUIPMENT

Figure 1:
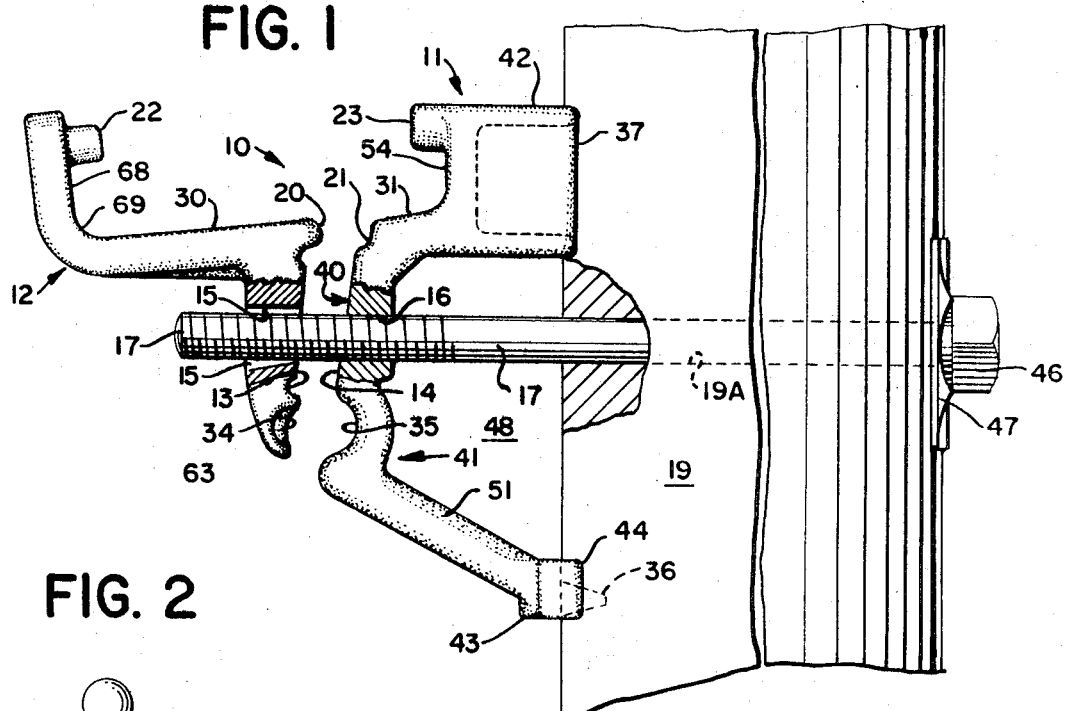
FIG. 1 is an end elevation view of the multipurpose clamp before the stringing block is attached thereto.

Successive steps in the installation of utility cables in accordance with the principles of the present invention are depicted in FIGS. 1 through 4. The multipurpose clamp apparatus shown generally as assembly 10 comprises a bearing member 11 and a clamp member 12. The lower portion 13 of the rear surface of clamp member 12 is contoured to cooperate with the midportion 14 of the front surface of bearing member 11. A bolt hole 15, located approximately in the middle of the lower portion 13 of clamping member 12, and a threaded bolt hole 16, located approximately in the middle of the midportion 14 of bearing member 11, permit a through bolt 17 to engage bearing member 11 to hold it securely against the pole, and draw together or release the bearing and clamp members 11 and 12 by moving a nut 18 which bears against the front surface of the midportion of clamp member 12. To this end, a through hole 19A is provided through a utility pole 19, through which bolt 17 passes and engages bearing member 11, clamp member 12 and nut 18. A ridge or fulcrum 20, located in the upper midportion of the rear surface of clamp member 12, engages with and seats in a shallow endwise groove 21 located spanning the top of the midportion of the front surface 14 of bearing member 11 when clamp member 12 is drawn up to bearing member 11.

A first trunnion support post 22 extends from the rear surface of the uppermost portion of clamp member 12, and a second trunnion support post 23 projects from the front surface of the uppermost portion of bearing member 11 extending towards the first trunnion support post 22. Trunnion support posts 22 and 23 securely support a stringing block 24 comprising a support block 25 at the bottom of the stringing block, and a sheave 26 and a spring loaded hinge plate 27 located in the upper portion of the stringing block 24. Preferably, the stringing block manufactured by Sherman and Reilly, Inc., known as S & R Model XS-110, may be advantageously used with the present invention. Recesses 28 and 29 are provided in the front and rear surfaces of the support block 25, approximately in the middle of these surfaces, to receive trunnion support posts 22 and 23 which support stringing block 24.

When a lineman first ascends the pole, he inserts the through bolt 17 through the pole and then spins threaded bearing member 11 down bolt 17 into its pole abutting or seated position. Clamp member 12 and a nut 18 are then assembled on bolt 17. When the clamp member 12 is drawn against bearing member 11 by nut 18 to support stringing block 24, the bottom of support block 25 rests upon surface 30, which is a horizontal surface on the upper portion of clamp member 12.

In the installation of a new utility cable along a pole line, a messenger cable 32 and its associated power conductor cables 33 are first drawn through stringing block 24, over sheave 26. After the cables have been drawn relatively taut between successive poles, the spring-loaded hinge plate 27 is sprung open to permit the cables to be withdrawn from the stringing assembly to be permanently anchored in clamp 10. At this time, nut 18 is again loosened to permit stringing block 25 to be removed from support posts 22 and 23. Since nut 18 has been loosened, room is thus provided for rocking relative movement of the clamp and bearing members and bolt 17 to admit messenger cable 32 between the two juxtaposed concave, half-groove surfaces 34 and 35 formed in clamp and bearing members 12 and 11, respectively. Surface 34 is located on the rear surface of clamp member 12 at its lowest portion while surface 35 is located on the front surface of bearing member 11 at the bottom segment of its midportion. The messenger cable 32 is separated from power cables 33 and placed between these gripping surfaces 34 and 35, which may preferably be undulated to provide extra gripping action by sinuously deforming or crimping cable 32, preventing lengthwise movement of the messenger cable. After the messenger cable has been inserted between gripping surfaces 34 and 35, the nut 18 is tightened for a second time to securely anchor the messenger cable to the clamp for permanent installation. As seen in FIG. 4, the messenger cable 32 and power-carrying cables 33 are held together at points spaced lengthwise away from the clamp. Deformable aluminum binding wire or other lashing means may be provided to achieve this holding action.

Bearing member 11 abuts utility pole 19 and imbeds itself therein by means of prongs 36, located at the lower portion of the rear surface of bearing member 11, and surface 37, located at the upper portion of the rear surface of bearing member 11. Prongs 36 securely anchor the bearing member to the utility pole when the utility pole is adapted to receive such a prong. For installations on concrete or steel utility poles, prongs 36 will not be utilized, and can be omitted. In order to lighten the weight of the bearing member, the pole abutting segment of its upper portion which terminates in surface 37 forms a substantially concave and hollow recess 38.

The above description sets forth in brief the operation of the present invention. For a fuller understanding a detailed description of the separate bearing 11 and clamp 12 member follows:

BEARING MEMBER

Figure 2:
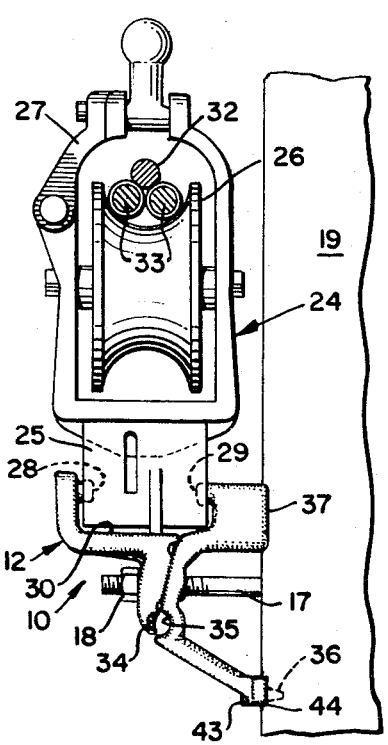
FIG. 2 is an end elevation view showing a stringing block securely anchored by the supporting trunnion posts of the multipurpose clamp of the present invention.
Figure 3:
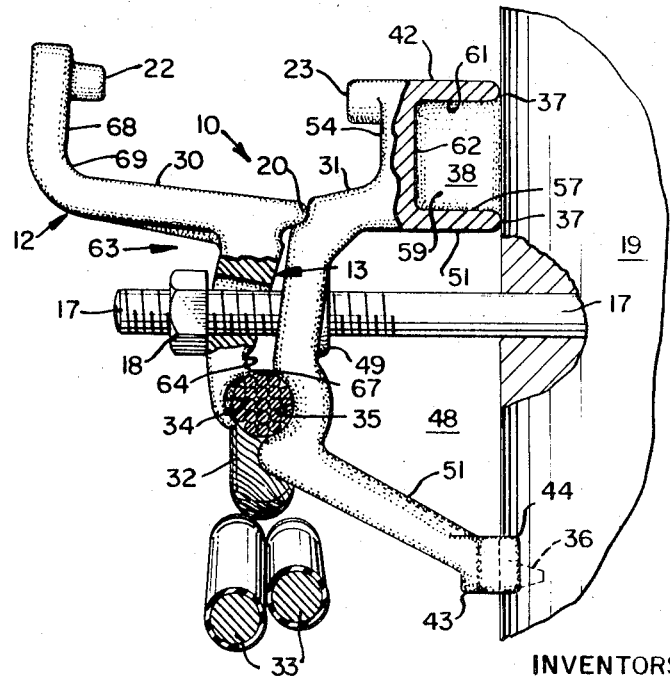
FIG. 3 is an end elevation view of the multipurpose clamp with the messenger cable held between the surfaces of the bearing and clamping member after the stringing block has been removed.

FIGS. 1, 2 and 3 present end elevation views of bearing member 11 and clamp member 12 and FIG. 5 is a front view of the bearing member which generally comprises a front surface 40 and a rear surface 41, as shown in FIG. 1. The rear surface 41 is provided with an upper and lower rearwardly extending pole-engaging pad portions 42 and 43 (FIG. 1), respectively transversely curved at the rearward surfaces 37 and 44 to substantially conform to the circumferential surface of pole 19 to which the bearing member 11 is adapted to be secured. Prong projections 36 extending outwardly from each lower pad portion 43 towards pole 19 are utilized to embed bearing member 11 into a wood pole. For installations on concrete or steel utility poles, prongs 36 will not be utilized, and may be omitted. The upper pad portion 42 terminates in an abutment rim or surface 37 seating against the surface of pole 19 when the bearing member is drawn against the pole. To reduce its weight, upper pad portion 42 is preferably provided with a concave cavity or hollow recess 38 facing the pole bounded by abutment rim 37. Bearing member 11 is provided centrally with through bolt receiving hole 16, threaded for engagement with through bolt 17 extending diametrically through the pole 19. The opposite end of the through bolt 17 has a head 46 as seen in FIG. 1 engaging a curved bearing washer 47 interposed between the head 46 and the pole. It will be understood that instead of a head 46, the opposite end of the through bolt 17 may be threaded to engage a nut screwed thereon.

The hole 16 in the body of bearing member 11 opens to a recess 48 defined by a rear wall segment 49 of the midportion of the back surface 41, and by the facing surfaces 51 of polewardly extending pad portions 42 and 43, so that wall segment 49 is outwardly offset, spaced away from the pole surface. Significant weight is saved by providing recess 48 between wall segment 49 and pole 19, while the resulting widespread separation of pads 42 and 43 provides sturdy, stable support for the assembly, resisting downslotting or shifting of bearing member 11 relative to pole 19. Lower pad portion 43 preferably comprises two separate parallel pad portions spaced apart from one another and extending polewardly from both ends of bearing member 11. Separate lower pad portions 43 are preferably employed to provide widely spaced stable support coupled with lightweight construction, as shown in FIGS. 1 and 5. The facing surfaces 51 of the pad portions 42 and 43 merge into the midsegment 49 of the back surface 41 of bearing member 11.

Viewed from the front, surface 40 at its bottom portion is concavely curved to receive the messenger cable 32, forming the endwise-extending messenger gripping surface 35. The front surface is also provided with an upper endwise-extending groove 21 of substantially concave cross section surmounted by the horizontal bearing surface 31. Groove 21 cooperates with the convex fulcrum or ridge 20 of clamp member 12 to position the clamp member 12 while it is being drawn toward bearing member 11. Horizontal bearing surface 31 smoothly merges into a vertically extending wall 54 which forms the outer wall portion of upper pad portion 42, facing outward away from the surface of pole 19. Cylindrically shaped trunnion support post 23 extends out from surface 54, protruding radially away from pole 19.

Messenger gripping surface 35 may, preferably, be undulated as shown at 55-55 (FIG. 5) to provide better gripping action to restrain the messenger cable 32 against lengthwise movement. Upper pad portion 42 is generally triangular in shape, with a floor forming a bottom portion 57 meeting sidewalls 58 and 59 along corner edges. Sidewalls 58 and 59, extending vertically, join one another in a smoothly arched or rounded upper wall 61. Concave or hollow recess 38 is defined by flat floor 57, sidewalls 58 and 59, smooth rounded upper wall 61, and flat back surface 62 of wall portion 54 facing the surface of pole 19.

CLAMP MEMBER

FIGS. 1 through 3 illustrate an end view of clamp member 12 while FIG. 4 illustrates a front view and FIG. 7 is a rear view of clamp member 12, comprising generally a front surface 63 and a rear surface 13. The lower half of front surface 63 is substantially curved away from pole 19 at its center and towards pole 19 at its upper and lower portions.

The lower portion 13 of the rear surface of clamp member 12 extends upward as a substantially flat stringing-support surface to join the horizontal surface 30 in a lengthwise-extending fulcrum ridge 20 which cooperates with groove 21 of bearing member 11 to provide pivoting relative movement of members 11 and 12. A substantially oval bolt hole 15 tapered slightly, diminishing toward pole 19, is provided through the center of the lower half of clamp member 12 extending from the front surface to the rear surface. By providing a larger opening at the front surface 63 than at the rear surface 13, freedom for pivoting action may be achieved with fulcrum ridge 20 pivoting in groove 21 of bearing member 11.

The messenger gripping surface 34 of clamp member 12 is located at the bottom of rear surface 13, and is concavely curved to form an endwise-extending, shallow messenger receiving groove to cooperate with bearing member gripping surface 35 to define a substantially cylindrical messenger clamping zone extending across clamp 10 for holding the messenger cable 32. Undulation 66 is preferably provided in clamp member gripping surface 34, cooperating and preferably alternating with similar shallow undulation crests 55-55 in surface 35, to enhance the holding action of the clamp and secure the messenger cable 32 against lengthwise movement by sinuous deformation or crimping of cable 32. Clamp member gripping surface 34 is surmounted by a lengthwise-extending ridge 67 formed by and blending with the uppermost edge portion of the shallow, messenger receiving surface 34 holding the messenger cable 32. A trough 64 surmounts ridge 67 (FIGS. 3 and 7), providing clearance accommodating the upper rim of bearing member gripping surface 35. Surfaces 34 and 35 are flared at their outer ends to accommodate messenger cable sag and change of line direction at each clamp assembly.

Horizontal surface 30 of clamp member 12 extends from fulcrum ridge 20 away from the pole 19 to meet the poleward facing surface of an upwardly extending arm 68 in a fillet 69. Arm 68 is juxtaposed to face wall 54 of bearing member 11, and trunnion support post 22 extends from the top portion of arm 68 towards pole 19 in juxtaposed, preferably coaxial and endwise-spaced apart relationship with trunnion support post 23 to provide support for stringing block 24.

Upstanding arm 68 on clamp member 12 also provides an anchoring post for securing the bight of an eye loop or connector bail deadending a light duty service drop, and trunnion post 22 provides a retaining flange for securing the eye loop thereon.

As shown in FIG. 2, rear surface 13 of clamp member 12 seats firmly against front surface 40 of bearing member 11 when the stringing block assembly is installed in the clamp, providing sturdy, solid support for the line-stringing operation of sheave 26. When the stringing block assembly is removed and the messenger 32 is being clamped between gripping surfaces 34 and 35, clamp member 12 pivots on ridge 20 in groove 21, and surface 13 does not reach surface 40. The clearance between these two surfaces provides unimpeded leeway for clamping deformation of messenger 32.

The complete stringing and clamping functions are accomplished, in accordance with the principles of the present invention, by the installation of only one through bolt, and by drawing the respective members together twice and separating them only once. When contrasted with the prior methods of installation which involved the use of two through bolts and the separate installation of the support means for stringing block 24, followed by its removal after the stringing operation was completed and the subsequent clamping of the messenger cable, the present invention will clearly be seen to save significant installation time.

Since the foregoing description and drawings are merely illustrative, the scope of the invention is broadly stated herein; and it should be liberally interpreted so as to obtain the benefit of all equivalents to which the invention is fairly entitled.

What we claim is:

1. A multipurpose clamp for stringing and clamping utility cables, comprising:
   A. a bearing member adapted to abut against a utility pole and including a bearing surface facing outward away from the pole and a first stringing block-supporting trunnion post protruding outward from the bearing member in a direction away from the pole,
   B. a clamping member dimensioned to be juxtaposed facing the bearing member, including a clamping surface facing the bearing surface and a second stringing block-supporting trunnion post protruding from the clamping member toward the pole,
   C. the bearing and clamping members being dimensioned so that when they are assembled and drawn toward each other,
      1. the clamping surface faces the bearing surface and cooperates therewith to define means for clamping a cable therebetween, and
      2. the first and second stringing block-supporting trunnion posts extend in coaxial and mutually opposed relationship with their facing ends being spaced apart for securing therebetween a stringing block holder,
   D. and anchoring means for drawing the bearing member and the clamping member toward each other.

2. The clamp defined in claim 1 wherein the clamping surface and the bearing surface incorporate undulations cooperating to deform a cable clamped between the clamping and bearing surfaces.

3. The clamp defined in claim 1 wherein the anchoring means includes:
   A. means forming a first through bolt hole extending poleward through the bearing member,
   B. means forming a second through bolt hole extending poleward through the clamping member,
   C. disengageable bolting means including a bolt adapted to extend through the first and second bolt holes and also through a through bolt hole formed in the utility pole, to draw the bearing member into abutting relationship against the utility pole and the clamping member into abutting relationship against the bearing member, whereby said bolting means secures the clamp to the utility pole and anchors both the cable and the stringing block to the clamp.

4. The clamp defined in claim 3 wherein the clamping surface and the bearing surface incorporate undulations cooperating to deform a cable clamped between the clamping and bearing surfaces.

5. The clamp defined in claim 3 wherein the bearing member is provided with a concave cavity facing the pole and terminated by an abutment rim seating against the pole surface when the bearing member is drawn against the pole.

6. The clamp defined in claim 1 wherein the first and second trunnion posts are substantially cylindrical in shape.

7. The clamp defined in claim 3 wherein the first through bolt hole is threaded for engagement with the threaded end of the through bolt protruding from the pole surface.